United States Patent [19]

Kupper

[11] 3,734,218

[45] May 22, 1973

[54] BALANCE

[75] Inventor: Walter Kupper, 8606 Greifensee, Switzerland

[73] Assignee: Mettler Instrument AG, Greifensee, Switzerland

[22] Filed: Sept. 25, 1972

[21] Appl. No.: 291,758

[30] Foreign Application Priority Data

Dec. 21, 1971  Switzerland..................18608/71

[52] U.S. Cl. ...................177/203, 177/212, 177/255, 177/DIG. 9
[51] Int. Cl.........G01g 1/34, G01g 7/00, G01g 21/24
[58] Field of Search..............177/203, 212, 229, 177/246, 252, 255, DIG. 9

[56] References Cited

UNITED STATES PATENTS 3,217,820  11/1965  Ast....................................177/255 X
3,347,328  10/1967  Schieser et al. ...................177/229
3,443,653  5/1969  Marshall..........................177/229 X

FOREIGN PATENTS OR APPLICATIONS 984,400  2/1965  Great Britain......................177/255

Primary Examiner—George H. Miller, Jr.
Attorney—Kurt Kelman et al.

[57] ABSTRACT

A single-pan analytical balance having two beams mounted spacedly one above the other in main bearings whose normally horizontal axes perpendicularly intersect each other. One arm of each beam carries a counterpoise whereas the other arm is secured to a hanger assembly carrying a top-loading weighing pan by hanger bearings whose pivot axes are parallel to the corresponding main bearings. The bearings consist essentially of flexible metal ribbons. An electromagnetic device acting on the hanger assembly permits weighing by compensation in a known manner.

9 Claims, 5 Drawing Figures 3,734,218

BALANCE

This invention relates to balances, and particularly to single-pan analytical balances in which the weighing pan is suspended from a balance beam by means of a hanger, and its weight and that of the hanger are normally balanced by a counterpoise on the beam.

Balances of the afore-described type have been built heretofore to high standards of precision and sensitivity and have found wide acceptance for chemical analysis work. The hanger of a balance of the known type depend from the balance beam, and the weighing pan is attached to the lower end of the hanger. The hanger is mounted on the beam by means of a knife edge and plate or another bearing type which permits swinging movement of the pan. It is common practice to equip such a balance with a damping device which quickly attenuates oscillation of the pan. Still, the time lost by an initial departure of the hanger assembly from a position in which its center of gravity is not vertically aligned with the pivot axis of the hanger bearing reduces the number of weighings that can be performed in a given time.

It is known to avoid pendulum movement of a weighing pan by mounting the pan on a parallelogram linkage one arm of which is formed by the balance beam. Balances so equipped are usually top-loading and will be referred to hereinafter as "precision balances." They can be operated much faster than the afore-described analytical balances and are simpler in their structure and operation since they require neither arrestments nor damping devices. Because of certain inherent features, balances of the last-mentioned type could not heretofore match the precision and sensitivity of the first-described analytical balances.

When a precision balance is equpped with knife-edge bearings, the weighing pan must be offset relative to the bearing which connects the pan carrier in the parallelogram linkage with the balance beam so that the horizontal forces resulting from the torque provide compressive or tensional forces which safely secure the link of the parallelogram parallel to the balance beam in its bearings. The bearing plates must be V-shaped in order to prevent shifting of the pivot axes regardless of the horizontal forces applied. This causes friction in the bearing and hysteresis effects.

These difficulties can be overcome at least in part by the provision of bearings consisting of flexible ribbons arranged in two perpendicular planes which intersect each other in the pivot axis of the bearing. In a precision balance equipped with such bearings, the weighing pan can be mounted vertically above the bearing connecting the pan carrier with the balance beam. Still, such a balance is sensitive to off-center loading of the weighing pan which is practically unavoidable and generates a torque causing some horizontal stress. Additionally, the known balances employing bearings of intersecting ribbons tend to develop internal stresses due to minor misalignments which unfavorably affect the accuracy of the weighings.

If the weight is read from the angle of inclination of the balance beam, it is very difficult for a balance with parallelogram linkage suspension to maintain adequate sensitivity over the entire range of angular beam movement.

For these and other reasons, the best precision balances known heretofore have a sensitivity not exceeding about $1:10^5$ (1 mg in 100 g) whereas other wise equivalent analytical balances have a sensitivity of $1:10^6$ or better.

It is the primary object of this invention to provide a balance which combines the advantages of the known analytical and precision balances while avoiding the afore-described shortcomings of both.

More specifically, the invention aims at providing a balance in which the weighing pan is guided firmly as by the parallelogram linkage of a precision balance, yet has no inherent features which would prevent it from being built to a precision significantly better than $1:10^5$.

With these and other objects in view, the invention provides a balance having two balance beams mounted on a normally stationary support for angular movement about respective pivot axes. Two counterpoises are respectively mounted on the beams for angular movement therewith. A hanger assembly carrying the weighing pan is pivotally secured to a first one of the balance beams for angular movement about a third pivot axis and to the second balance beam for angular movement about a fourth pivot axis. All pivot axes extend hoizontally in the operating position of the balance, and the fourth pivot axis intersects a vertical plane including the third pivot axis, preferably perpendicularly.

Other features, additional objects, and many of the attendant advantages of this invention will readily become apparent as the invention becomes better understood by reference to the following detailed description of preferred embodiments when considered in connection with the appended drawing in which.

Figure 1:
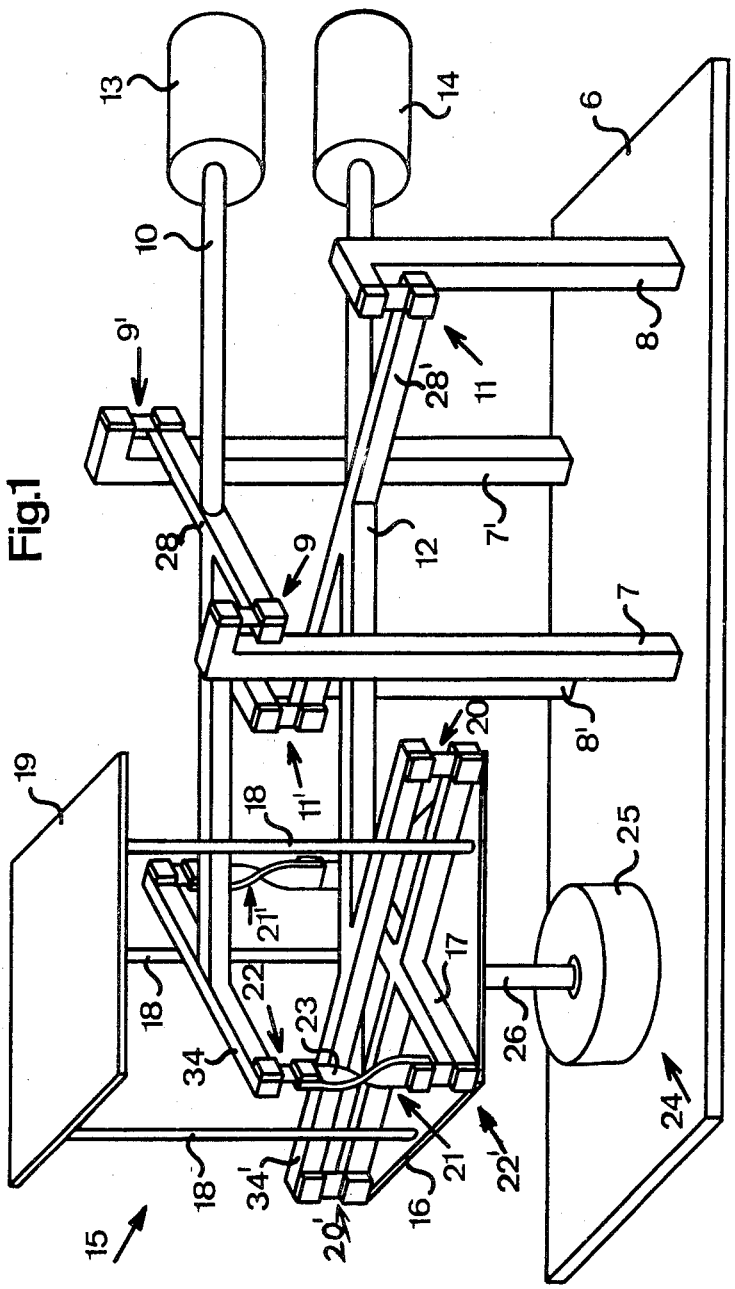
FIG. 1 shows a balance of the invention in a perspective view.
Figure 3:
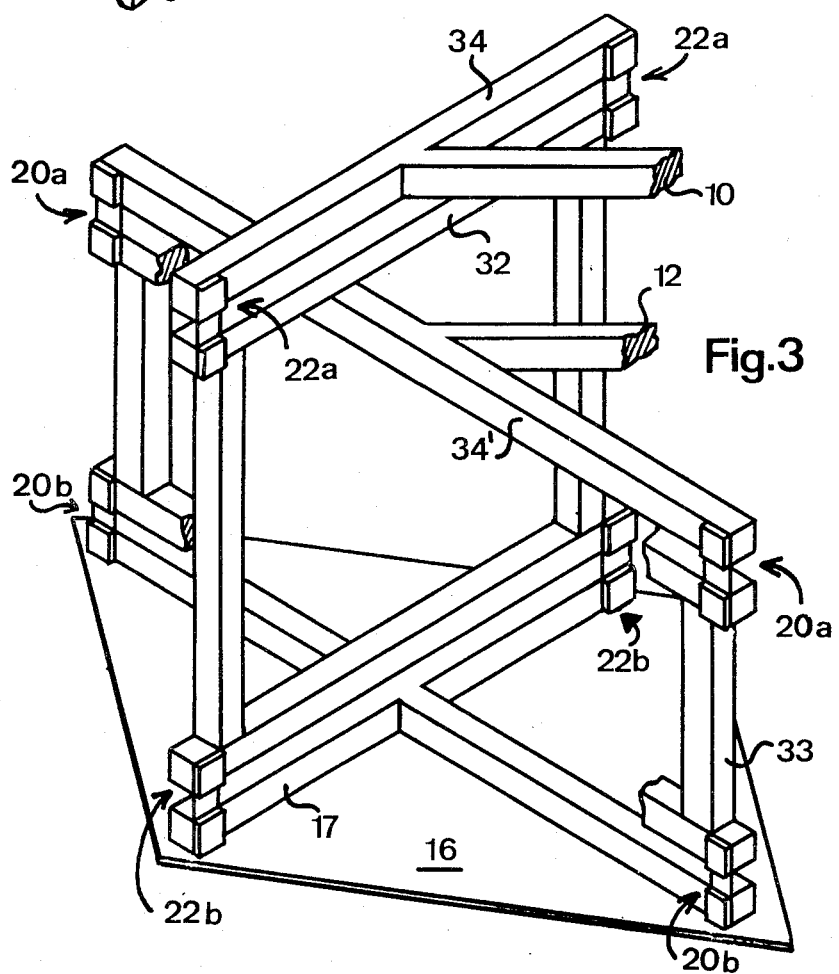
FIG. 3 shows a modified detail for the balance of FIG. 1 in a perspective view on a somewhat larger scale.
Figure 4:
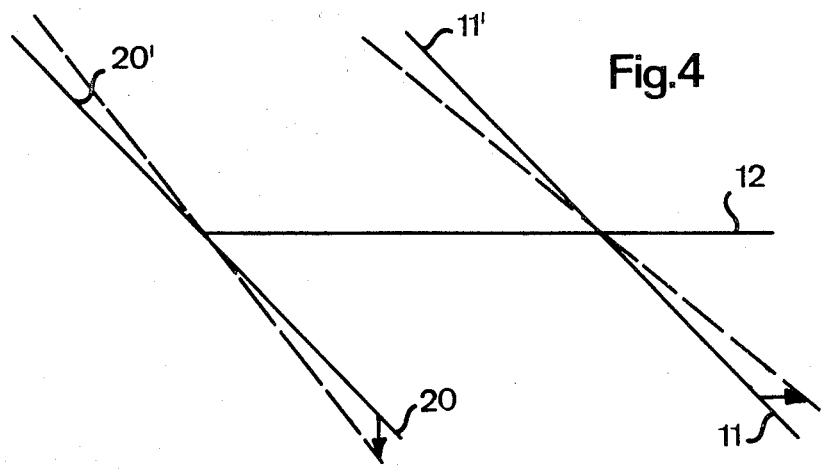
Figure 5:
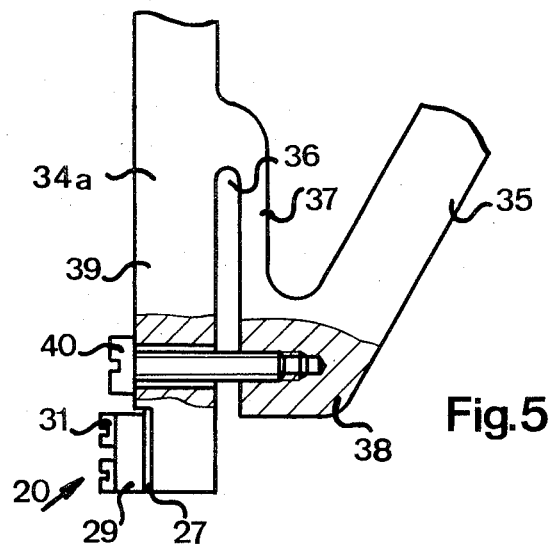

FIG. 4 diagrammatically illustrates relationships of pivot axes associated with one of the beams of the balance of FIG. 1; and FIG. 5 shows a modified bearing arrangement suitable for the balances of both FIGS. 1 and 3.

Referring now to the drawing in detail, and initially to FIG. 1, there is seen a balance whose stationary support structure consists essentially of a base plate 6 and of two pairs 7,7' and 8,8' of upright columns. The balance has two beams 10,12 arranged spacedly one above the other. A cross bar 28 integrally attached to the center portion of the beam 10 is mounted between the free upper ends of the columns 7,7' by means of main bearings 9,9'. A corresponding cross bar 28' of the lower beam 12 is similarly mounted by main bearings 11,11' on the upper ends of the columns 8,8' which are shorter than the columns 7,7'.

In the illustrated equilibrium condition of the balance, the beams 10,12 are parallel and horizontal. The bearings 9,9' have a common first pivot axis which is horizontal in all operating positions of the balance, and the common second pivot axis of the bearings 11,11' is also horizontal and perpendicular to the vertical plane which includes the pivot axis of the bearings 9.9'.

The arms of the beams 10,12 which extend to the right, as viewed in FIG. 1, from the cross bars 28,28' carry respective counterpoises 13,14 which may be adjusted along the beams and fixed in the adjusted positions as is conventional and has not been illustrated. A hanger assembly 15 is supported on the other arms of the two beams 10,12.

Cross-bars 34,34' on the ends of the beams 10,12 remote from counterpoises 13,14 are parallel to the cross arms 28,28' on the same beam and are pivotally connected with the four corners of a square bottom plate 16 diagonally braced by a cross-shaped rib 17. Three rigid upright bars 18 extend from the bottom plate 16 beyond the upper balance beam 10 and hold a weighing pan 19 parallel to the bottom plate 16.

The bottom plate 16 is suspended from the cross bars 34,34' by respective pairs of pivots 21,21' and 20,20'. Each pivot 21,21' includes a flexible ribbon assembly 22 attached to the cross bar 34 and, a rigid connector strip 23 depending from the ribbon assembly 22 and twisted about its longitudinal axis in such a manner that its lower transverse edge is located in a vertical plane perpendicular to the vertical plane drawn through the uppertransverse edge which is attached to the ribbon assembly 22. An additional flexible ribbon assembly 22' of each pivot 21,21' is attached to the lower transverse edge of the connector strip 23. The pivots 21,21' permit the hanger assembly 15 to move angularly about a third horizontal pivot axis through the ribbon assemblies 22, the third axis being parallel to the cross bar 34, and such movement would be analogous to the pendulum movement of the hanger and pan on a conventional analytical balance.

The pivots 20, 20' consist of respective single flexible ribbon assemblies which prevent the afore-described pendulum movements about the third pivot axis, but would permit oscillation about a fourth pivot axis parallel to the beam 34' in the absence of the pivots 21, 21'. The four pivots jointly guide the bottom plate 16 and the pan 19 in the same manner as a parallelogram linkage in that they hold the supporting face of the pan 19 in a horizontal position at all times while the hanger assembly 15 as a whole moves vertically up or down.

The balance is held in the illustrated position by an electromagnetic compensating mechanism 24, known in itself, which consists essentially of a permanent pot magnet 25 and a movable coil, obscured by the magnet 25, and suspended from the bottom plate 16 by a carrier bar 26. The magnet 25 is fixedly mounted on the base plate 6 and supplements the forces of the counterposies in accordance with the current passing through the movable coil in a manner known in itself, for example, from the Swiss Pat. No. 508,204.

Figure 2:
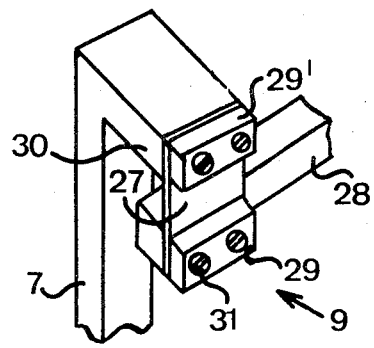
FIG. 2 illustrates a portion of the apparatus of FIG. 1 on a larger scale.

The several flexible ribbon assemblies are closely similar or identical in structure, and only the ribbon assembly constituting the main bearing 9 will be described in detail with reference to FIG. 2. One of the two longitudinal end portions of a rectangular metal ribbon 27, a few hundreds of a millimeter thick, is clamped by a small plate 29 and screws 31 to one end of the cross bar 28, while the other end is similarly clamped by a plate 29' to the rectangularly offset top end 30 of the column 7. THe ribbon 27 is held in a vertical plane in the normal operating position of the balance by the weight of the cross bar 28 and of associated structure which holds the ribbon 27 under tensile stress and opposes flexing of the ribbon. As will be evident from inspection of FIG. 1, the lower end portion of each illustrated flexible ribbon is attached to a load whose weight is transmitted by the upper end of the ribbon to the stationary balance structure either directly or indirectly. The exposed portion of each ribbon 27 between the clamping plates 29,29' has a length of only a few millimeters, and can be flexed only about a horizontal flexing or pivot axis. Each ribbon 27 is biased by the applied load toward a vertical plane which includes the associated pivot axis or flexing axis.

The two ribbon assemblies 22' at the lower ends of the two connector strips 23 have ribbons located in parallel vertical planes perpendicular to the common vertical plane defined by the ribbons in the assemblies 22 and including the (third) pivot axis of the pivots 22.

The connector strips 23 are necessary for bridging the vertical distance between the cross bar 34 and the bottom plate 16. If the secondary ribbon assemblies 22' were not provided, minimal differences in the lengths of the two strips 23 would cause stresses in the hanger assembly 15 and a concomitant loss in precision and sensitivity. The flexing axes of the ribbons in the ribbon assemblies 22' are parallel to the pivot axes of the pivots 20,20', and perpendicular to a vertical plane through the pivot axis of the assemblies 22. Any slight difference in the effective lengths of the strips 23,23' can thus be compensated by a corresponding minimal flexing of the ribbon assemblies 22', thereby avoiding stresses from being developed in the hanger assembly.

This expedient is fully effective only in a compensation type balance in which the weighing pan is in the same horizontal plane in all positions of balance equilibrium, regardless of the load that is being weighed. Such a compensation type balance has been illustrated in FIG. 1. It is not effective in a balance in which the inclination of the balance beam provides indicia of the weight to be determined, as will be discussed hereinbelow with reference to FIG. 3.

The minimal angular deviations of the beams 10, 12 during weighing are absorbed by the flexible ribbons in the pivots 20, 22 without affecting the sensitivity of the balance.

The balance illustrated partly in FIG. 3 may be identical with that illustrated in FIG. 1 as far as not illustrated except for a conventional scale and indicia for showing the inclination of one of the balance beams 10, 12 as a measure of the weight carried by the pan 19. As is seen from FIG. 3, the illustrated balance does not have a magnetic compensation system, and the suspension assembly illustrated in FIG. 3 moves vertically between a zero equilibrium position and an equilibrium position under load. Provisions have to be made, therefore, for permitting the relative movement of the balance beams and the hanger assembly.

The bottom plate 16 of the hanger assembly is suspended from the two cross bars 34, 34' of the balance beams 10, 12 by means of respective rectangular frames 32, 33. The frame 32 is attached to the cross bar 34 by means of two ribbon assemblies 22a at the respective ends of the cross,bar, and to the bottom plate 16 by another pair of ribbon assemblies 22b located below the two ribbon assemblies 22a respectively. Similarly, the frame 33, partly broken away in FIG. 3 for the sake of clarity is attached to the cross bar 34' by a pair of upper ribbon assemblies 20a, and to the bottom plate 16 by a pair of ribbon assemblies 20b. Each frame 32,33 is normally vertical, the pivot axes or flexing axes of the associated four ribbon assemblies are parallel, and the flexible metal ribbons in the four assemblies extend in a common vertical plane. The frames 32,33 are rigid enough not to be subject to any distortion under the forces exerted on them during weighing.

When the beams 10,12 are pivoted out of their normal position by a load applied to the weighing pan, omitted from FIG. 3, the frames 32,33 are moved into slightly oblique planes and the associated metal ribbons are shifted out of the common vertical plane. Because of the stiffness of the frames, however, the base plate 16 remains precisely horizontal at all times, and the entire hanger assembly moves as if it were guided by a parallelogram linkage.

Similar results can be obtained without the frame 33 if the spacing of the bottom plate 16 from the lower beam 12 and the dimensions of the connecting pivot assemblies are carefully selected.

FIG. 4 diagrammatically illustrates the spatial relationship between the longitudinal axis of the beam 12, the second pivot axis between the pivots 11,11' and the fourth pivot axis between the pivots 20,20' in fully drawn lines. The two pivot axes should be as precisely parallel as possible for highest sensitivity and precision of the balance. Manufacturing tolerances, however, are unavoidable and may cause the pivot axes to deviate from the desired relationship as indicated by broken lines in a grossly exaggerated manner for the purpose of convenient description. The second pivot axis 11-11' may be deflected by such tolerances in a horizontal plane while the axis 20-20' may be deflected vertically, as indicated by short arrows.

Deviations of each pivot axis in a horizontal or vertical direction may be compensated for in the manner illustrated in FIG. 5 with reference to the pivot 20. The cross bar 34a at the end of the beam 12, not itself shown, differs from the cross beam 34, as illustrated in FIG. 1, in having a forked free end. Its two branches 37,39 are separated by a slot 36. A metal ribbon 27 of the pivot 20 is attached to the heavier branch 39 by a plate 29 and screws 31 as described with reference to FIG. 2. The narrower branch 37 is integral with a rigid strut 35, only partly shown, which is fixedly fastened to the beam 12. A screw 40 passes freely through a bore of the branch 39 and threadedly engages a blind bore in the bight portion 38 of the V-shape jointly formed by the branch 37 and the strut 35. When the screw 40 is tightened, the branch 39 is flexed toward the strut 35 in a horizontal plane, and the position of the pivot 20 and of the associated fourth pivot axis is shifted accordingly to correct a minor and sometimes unavoidable manufacturing defect.

It is preferred to equip each pair of pivots 9,9'; 11,11'; 20,20'; 21,21' with a device of the type shown in FIG. 5. The balance of FIG. 1 when so equipped, can be adjusted by means of the several screws 40 to be practically unaffected by an off-center position of a load on the weighing pan 19. In inclination balances,- such as the balance partly shown in FIG. 3, it is preferable additionally to provide analogous devices for adjusting the parallel alignment of the pivot axes on each beam in a vertical direction, the slot 36 and strut 35 in the vertical adjustment devices being offset 90° from the respective positions shown in FIG. 5.

When a series of balances of the invention having the same nominal structure are built, the necessary number of turns of the adjusting screws 40 may be determined for one balance of the series by placing a standard weight off-center on the weighing pan and adjusting the screws until the indicated weight is equal to the known weight of the standard. All balances of the same series will then be properly adjusted when the same number of turns is given to the respective screws 40 for the same difference between the indicated and known weight of the standard.

While the invention has been described with reference to top-loading balances, the weighing pan may be fixedly suspended below the hanger assembly by bars analogous to the bars 18 or similar rigid elements without changing the mode of operation and without loss of advantages. The top-loading balance of FIG. 1 is preferably enclosed in a housing which protects it against the movement of the ambient air as is customary in analytical balances and has not been shown.

The weight compensating system illustrated in FIG. 1, which acts on the arm of each balance beam remote from the associated counterpoise, is not affected by changes in ambient temperature. The range of the balance may be enlarged by supplemental weights releasably attached to the counterpoises in a conventional manner.

The illustrated arrangement in which the pivot axes 20,20' and 21,21' are perpendicular to each other are preferred, but the advantages of the invention are available by any arrangement in which the two pivot axes intersect each other at an angle significantly greater than 0°. A perpendicular arrangement of the axes permits particularly easy adjustment as shown, for example, in FIG. 5.

The two balance beans 10,12 may be mounted on the common supporting structure in any desired spatial arrangement. It is preferred, however, to mount them one above the other in the interest of a compact design. The overall height may thereby be reduced to less than that of an otherwise comparable, conventional precision balance having knife edge bearings, in which the overall height cannot be reduced to a value in which the parallelogram linkage would become ineffective.

The flexible ribbon pivots illustrated do not oppose flexing with significant forces of reaction which could cause inaccurate weighings. THey do not require arrestments, and are mechanically very rugged. Still, at leas some of the advantages of the invention may be achieved in balances having some knife-edge bearings.

It should be understood, therefore, that the foregoing disclosure relates only to preferred embodiments of the invention and that it is intended to cover all changes and modifications in the examples of the invention herein chosen for the purpose of the disclosure which do not constitute departures from the spirit and scope of the appended claims.

What is claimed is:

1. A balance comprising, in combination:
  a. normally stationary support;
  b. a first balance beam mounted on said support for angualr movement about a first pivot axis;
  c. a second balance beam mounted on said support for angular movement about a second pivot axis;
  d. two counterpoises respectively mounted on said first and second balance beams for angular movement therewith;
  e. hanger means pivotally secured to said first balance beam for angular movement about a third pivot axis,
    1. said hanger means being secured to said second balance beam for angular movement about a fourth pivot axis,
    2. each of said pivot axes extending horizontally in the operating position of said balance, 3. said fourth pivot axis intersecting a vertical plane including said third pivot axis in said operating position; and f. a weighing pan fixedly mounted on said hanger means.

2. A balance as set forth in claim 1, wherein said first and third pivot axes spacedly extend in a common direction, and said second and fourth pivot axes spacedly extend in a common direction.

3. A balance as set forth in claim 2, wherein said fourth axis perpendicularly intersects said vertical plane.

4. A balance as set forth in claim 2, wherein said beams are arranged one above the other in said operating position.

5. A balance as set forth in claim 2, wherein each balance beam has a first arm and a second arm, the respective first arms of said balance beams carrying said counterpoises, and the respective second arms being pivotally secured to said hanger means, said balance further including electromagnetic compensating means connected to the respective second arms of said balance beams for adjustably compensating the forces exerted on said balance beams until said balance beams are stationary relative to said first and second pivot axes respectively.

6. A balance as set forth in claim 2, wherein said balance beams each include two cross bar portions, the balance further comprising first pivot means including two pivot assemblies spaced along a first one of the cross bar portions of said first balance beam in the direction of said first pivot axis and connecting said first balance beam to said support, second pivot means including two pivot assemblies spaced along a first one of the cross bar portions of said second balance beam in the direction of said second pivot axis and connecting said second balance beam to said support, third pivot means including two pivot assemblies spaced along the second cross bar portion of said first balance beam in the direction of said third pivot axis and connecting said first balance beam to said hanger means, and fourth pivot means including two pivot assemblies spaced along the second cross bar portion of said second balance beam in the direction of said fourth pivot axis and connecting said second balance beam to said hanger means, said hanger means including a rigid hanger assembly pivotally secured to said balance beams by said third and fourth pivot means, and rigidly connected to said weighing pan, each pivot assembly including a flexible ribbon member mounted for flexing movement about the associated pivot axis and under tension opposing said flexing movement, the ribbon members in each pivot means jointly constituting the sole connecting means respectively connecting said balance beams to said support and to said hanger means.

7. A balance as set forth in claim 2, further comprising first and second pivot means respectively securing said balance beams to said support for angular movement about said first and second pivot axes, and third and fourth pivot means respectively securing said hanger means to said first and second balance beams for angualr movement about said third and fourth pivot axes, each pivot means including at least one flexible ribbon member attached to an associated balance beam, said ribbon member being stressed in tension while transmitting the weight of said hanger means and of said weighing pan between said balance beams and, respectively, said hanger means and said support.

8. A balance as set forth in claim 7, wherein said third pivot means includes another flexible ribbon member attached to said hanger means for flexing movement about a flexing axis, and rigid weight transmitting means connecting said one ribbon member of said third pivot means to said other ribbon member for transmitting the weight of said pan and of said hanger means from said other ribbon member to said one ribbon member and there-by to said first balance beam, said flexing axis and said third pivot axis extending in respective perpendicularly offset vertical planes in said operating position of the balance.

9. A balance as set forth in claim 7, wherein said second balance beam has a resiliently deformable portion, one of said ribbon members of said second and fourth pivot means being attached to said deformable portion for flexing movement about the corresponding pivot axis, said balance further including adjusting means for deforming said portion transversely of said corresponding pivot axis, and for thereby angularly shifting said corresponding axis.

* * * * *